United States Patent
Kageyama et al.

(10) Patent No.: US 9,765,246 B2
(45) Date of Patent: Sep. 19, 2017

(54) ADHESIVE COMPOSITION FOR HIGH-POWER OPTICAL FIBER

(71) Applicant: THE YOKOHAMA RUBBER CO., LTD., Minato-ku, Tokyo (JP)

(72) Inventors: Hirokazu Kageyama, Hiratsuka (JP); Kazushi Kimura, Hiratsuka (JP); Seiko Mitachi, Hachioji (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/120,250

(22) PCT Filed: Feb. 19, 2015

(86) PCT No.: PCT/JP2015/054656
§ 371 (c)(1),
(2) Date: Aug. 19, 2016

(87) PCT Pub. No.: WO2015/125882
PCT Pub. Date: Aug. 27, 2015

(65) Prior Publication Data
US 2017/0073557 A1    Mar. 16, 2017

(30) Foreign Application Priority Data
Feb. 20, 2014  (JP) .................. 2014-030423

(51) Int. Cl.
| | |
|---|---|
| C08G 77/14 | (2006.01) |
| C09J 163/00 | (2006.01) |
| C09J 183/00 | (2006.01) |
| G02B 6/36 | (2006.01) |
| C09J 183/14 | (2006.01) |
| G02B 6/38 | (2006.01) |
| C08L 83/04 | (2006.01) |
| C08L 63/00 | (2006.01) |
| C08G 77/42 | (2006.01) |

(52) U.S. Cl.
CPC .......... *C09J 163/00* (2013.01); *C09J 183/00* (2013.01); *C09J 183/14* (2013.01); *G02B 6/36* (2013.01); *G02B 6/3861* (2013.01); *C08G 77/14* (2013.01); *C08G 77/42* (2013.01); *C08L 63/00* (2013.01); *C08L 83/04* (2013.01)

(58) Field of Classification Search
CPC ...... C09J 163/00; C09J 183/00; C09J 183/05; C08L 83/04; C08L 63/00
See application file for complete search history.

(56) References Cited

U.S. PATENT DOCUMENTS

| | | | |
|---|---|---|---|
| 2008/0213602 A1 | 9/2008 | Morita et al. | |
| 2008/0319142 A1 | 12/2008 | Kikkawa et al. | |
| 2010/0029804 A1* | 2/2010 | Nakayama ......... | C08G 18/3876 522/172 |

FOREIGN PATENT DOCUMENTS

| | | |
|---|---|---|
| JP | 2006-070170 A | 3/2006 |
| JP | 2006-199851 A | 8/2006 |
| JP | 2007-191667 A | 8/2007 |
| JP | 2012-180462 A | 9/2012 |
| JP | 2013091703 A | 5/2013 |

OTHER PUBLICATIONS

Office Action dated Apr. 12, 2017 issued in the corresponding German Patent Application 11 2015 000 902.7 with English translation thereof.

* cited by examiner

*Primary Examiner* — Margaret Moore
(74) *Attorney, Agent, or Firm* — Carrier Blackman & Associates, P.C.; Joseph P. Carrier; Anne G. Sabourin

(57) ABSTRACT

An object of the present invention is to provide an adhesive composition for a high-power optical fiber having a low pull-in amount. The adhesive composition for a high-power optical fiber of the present invention contains: a compound (A) having an aromatic ring and a reactive silicon-containing group; a glycidyl compound (B); and a compound (C) having a silsesquioxane cage structure.

19 Claims, 1 Drawing Sheet

ADHESIVE COMPOSITION FOR HIGH-POWER OPTICAL FIBER

TECHNICAL FIELD

The present invention relates to an adhesive composition for a high-power optical fiber.

BACKGROUND ART

In recent years, due to the expansion of the internet, technologies to increase communication capability have become increasingly important, and optical fiber network has been expanded. In joining technologies used for fabrication of optical materials and optical elements used in such optical communication system, it is popular to connect an optical fiber using a connector (e.g., SC connector), and an adhesive composition is used to fix the optical fiber to the ferrule in the connector.

For example, Patent Document 1 discloses "an adhesive composition comprising an epoxysilane obtained by reacting an epoxy resin with an imino group-containing silane coupling agent, and a particular imidazole compound" (claim 1).

Meanwhile, when light is transmitted through an optical fiber, some of the light may be absorbed into a component and converted to thermal energy, thereby increasing the temperature of the component. Furthermore, when the temperature of the component is increased, the optical fiber may be pulled in within the connector due to the difference between coefficients of linear thermal expansion of components. When such pull-in of the optical fiber occurs, a gap is created at the edge of the optical fiber, thereby increasing reflection attenuation.

Therefore, the adhesive composition is required to maintain the ferrule and the optical fiber at a high level and less likely to cause pull-in even when light is transmitted therethrough.

CITATION LIST

Patent Literature

Patent Document 1: Japanese Unexamined Patent Application Publication No. 2007-191667A

SUMMARY OF INVENTION

Technical Problem

Recently, output of optical transmission has been increased (power has been increased) in response to demand for ultralong distance transmission or wavelength multiplex transmission, adhesive compositions used in connectors are required to have functions to maintain an optical fiber in a ferrule at even higher level.

In such circumstances, the inventors of the present invention produced a connector by preparing an adhesive composition using Patent Document 1 as a reference, and joining an optical fiber and a ferrule using the composition. Using the obtained connector, continuous wave operation was performed at a high power (approximately 1 W). As a result, it was found that the pull-in amount after the continuous wave operation did not satisfy the level required these days.

Therefore, in light of the circumstances described above, an object of the present invention is to provide an adhesive composition for a high-power optical fiber that can produce a connector having a low pull-in amount even when the connector is used for high power applications.

Solution to Problem

As a result of diligent research to solve the problems described above, the inventors of the present invention have found that a connector having a low pull-in amount even when the connector is used for high power applications can be produced by blending a compound having a silsesquioxane cage structure. Specifically, the inventors discovered that the object described above can be achieved by the following features.

(1) An adhesive composition for a high-power optical fiber comprising: a compound (A) having an aromatic ring and a reactive silicon-containing group; a glycidyl compound (B); and a compound (C) having a silsesquioxane cage structure.

(2) The adhesive composition for a high-power optical fiber according to (1) above, further comprising an imidazole compound (D).

(3) The adhesive composition for a high-power optical fiber according to (1) or (2) above, where the reactive silicon-containing group is a hydrolyzable silicon-containing group.

(4) The adhesive composition for a high-power optical fiber according to any one of (1) to (3) above, where the compound (A) is obtained by reacting an epoxy compound (e) with a compound (f) having a reactive group that reacts with the epoxy group contained in the epoxy compound (e).

(5) The adhesive composition for a high-power optical fiber according to (4) above, where
the epoxy compound (e) is an aromatic epoxy compound, and
the compound (f) is an iminosilane compound.

(6) The adhesive composition for a high-power optical fiber according to (4) above, where
the epoxy compound (e) is an epoxysilane compound, and
the compound (f) is an aromatic amine compound.

(7) The adhesive composition for a high-power optical fiber according to any one of (4) to (6) above, where
the compound (f) contains an amino group or an imino group, and
the number of equivalent of active hydrogen in the amino group or the imino group is from 0.1 to 1.0 equivalent relative to the amount of epoxy group contained in the epoxy compound (e).

(8) The adhesive composition for a high-power optical fiber according to any one of (1) to (7) above, where the compound (C) is obtained by subjecting at least one type of silane selected from the group consisting of epoxysilane, aminosilane, vinylsilane, methacrylsilane, acrylsilane, and mercaptosilane to condensation.

(9) The adhesive composition for a high-power optical fiber according to any one of (1) to (8) above, where
a proportion (A/(A+B+C)) of a content of the compound (A) in a total content (A+B+C) of the content of the compound (A), a content of the glycidyl compound (B), and a content of the compound (C) is from 20 to 70 mass %;
a proportion (B/(A+B+C)) of the content of the glycidyl compound (B) in the total content (A+B+C) is from 20 to 70 mass %; and
a proportion (C/(A+B+C)) of the content of the compound (C) in the total content (A+B+C) is from 5 to 40 mass %.

Advantageous Effects of Invention

As described below, the present invention can provide an adhesive composition for a high-power optical fiber that can produce a connector having a low pull-in amount even when the connector is used for high power applications.

DESCRIPTION OF EMBODIMENTS

Figure 1:
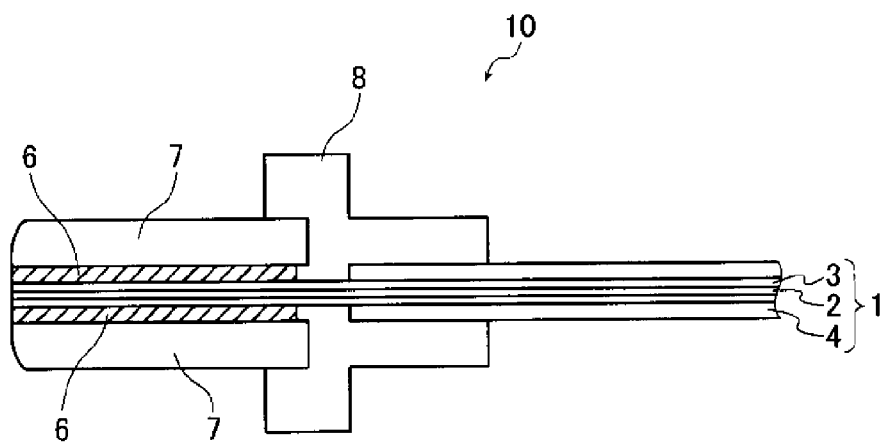
FIG. 1 is a cross-sectional view of an embodiment of a connector produced using the adhesive composition for a high-power optical fiber of the present invention.

The adhesive composition for a high-power optical fiber of the present invention will be described below.

In this specification, a numerical range represented using "(from) . . . to . . . " refers to a range including the numerical values stated before and after the " . . . to . . . " as an upper limit value and a lower limit value.

Furthermore, in this specification, "(meth)acryl group" refers to "acryl group" or "methacryl group".

Adhesive Composition for High-power Optical Fiber

The adhesive composition for a high-power optical fiber of the present invention (hereinafter, also simply referred to as "composition of the present invention") contains: a compound (A) having an aromatic ring and a reactive silicon-containing group; a glycidyl compound (B); and a compound (C) having a silsesquioxane cage structure.

Since the composition of the present invention has such constitution, it is conceived that the pull-in amount is low even when the composition is used for high power applications. Although the reason is not clear, it is assumed to be as follows.

Since the composition of the present invention contains the compound (A) having an aromatic ring and a reactive silicon-containing group and the glycidyl compound (B) as described above, the compound (A) and the compound (B) are bonded due to heating or the like to form a three-dimensional crosslinked structure. Therefore, it is conceived that, since the composition of the present invention contains the compound (C) having a silsesquioxane cage structure as described above, an adhesive layer having a structure in which the rigid silsesquioxane cage structures are uniformly arranged in the crosslinked structure is formed due to high affinity between the silsesquioxane cage structure and the silicon-containing structure derived from the reactive silicon-containing group within the crosslinked structure.

The adhesive layer formed from the composition of the present invention is thus thought to have a significantly excellent balance between heat resistance and adhesive strength. That is, the glass transition temperature (Tg) is increased due to the introduction of the rigid silsesquioxane cage structures, thereby enhancing the heat resistance. Meanwhile, it is conceived that the adhesive strength is maintained at a high level since the silsesquioxane cage structures are uniformly arranged. As a result, it is conceived that the connector produced using the composition of the present invention hardly causes pull-in even when high power optical transmission is performed.

This is also inferred from the fact that, for cases where the adhesive composition contains no compound (C) having a silsesquioxane cage structure (comparative examples), the pull-in amount is greater compared to the cases where the composition contains a compound (C) having a silsesquioxane cage structure (working examples) as shown in working examples and comparative examples described below.

Each component contained in the composition of the present invention will be described in detail hereinafter.

Compound (A) Having Aromatic Ring and Reactive Silicon-containing Group

The compound (A) contained in the composition of the present invention is not particularly limited as long as the compound (A) is a compound having at least one aromatic ring and at least one reactive silicon-containing group.

The aromatic ring is not particularly limited; however, the aromatic ring is preferably an aromatic ring having from 6 to 20 carbon atoms.

Specific examples of the aromatic ring include a benzene ring, naphthalene ring, anthracene ring, phenanthrene ring, fluorene ring, triphenylene ring, naphthacene ring, biphenyl ring (the two phenyl groups may be bonded in any bonding form), and terphenyl ring (the three benzene rings may be bonded in any bonding form). Among these, a benzene ring is preferable.

The reactive silicon-containing group is a silicon-containing group that has from 1 to 3 reactive groups bonded to a silicon atom and that can form crosslink(s) by causing a reaction in the presence of moisture or a crosslinking agent or the like or, as necessary, by using a catalyst or the like. Specific examples thereof include a silicon halide-containing group, silicon hydride-containing group, hydrolyzable silicon-containing group, and the like. Among these, a hydrolyzable silicon-containing group is preferable.

The silicon halide-containing group described above has 1 to 3 halogen groups bonded to a silicon atom, and specific examples thereof include a chlorodimethylsilyl group, dichloromethylsilyl group, and trichlorosilyl group.

The silicon hydride-containing group described above has 1 to 3 hydrogen atoms bonded to a silicon atom, and specific examples thereof include a hydrodimethylsilyl group, dihydromethylsilyl group, and trihydrosilyl group.

The silicon halide-containing group can, for example, form a bond to crosslink by causing a dehydrohalogenation reaction with the silicon hydride-containing group described above. Furthermore, the silicon halide-containing group can form a silicon-carbon bond to crosslink, by causing a metathesis reaction with a Grignard reagent and then causing a metal dehalogenation reaction. Furthermore, when an alkali metal or magnesium is used, the silicon halide-containing group can form a silicon-carbon bond to crosslink, by causing a reductive silylation reaction with an aromatic hydrocarbon, conjugated diene, aromatic aldehyde, ketone, carboxylic acid, ester, or imine The silicon hydride-containing group can, for example, form a bond to crosslink by causing a dehydrohalogenation reaction with the silicon halide-containing group described above. Furthermore, the silicon hydride-containing group can form a silicon-carbon bond to crosslink by causing a hydrosilylation reaction with a compound having an unsaturated carbon bond.

The hydrolyzable silicon-containing group is a silicon-containing group that has 1 to 3 hydroxyl groups and/or hydrolyzable group bonded to a silicon atom, and that, in the presence of moisture or a crosslinking agent and with the use of a catalyst or the like as necessary, is capable of crosslinking by causing a condensation reaction and thus forming siloxane bonds. Examples of such groups include alkoxysilyl groups, alkenyloxysilyl groups, acyloxysilyl groups, aminosilyl groups, aminoxysilyl groups, oximesilyl groups, and amidosilyl groups. Specifically, alkoxysilyl groups, alkenyloxysilyl groups, acyloxysilyl groups, aminosilyl groups, aminoxysilyl groups, oximesilyl groups, amidosilyl groups, and the like represented by formulas below are preferably used.

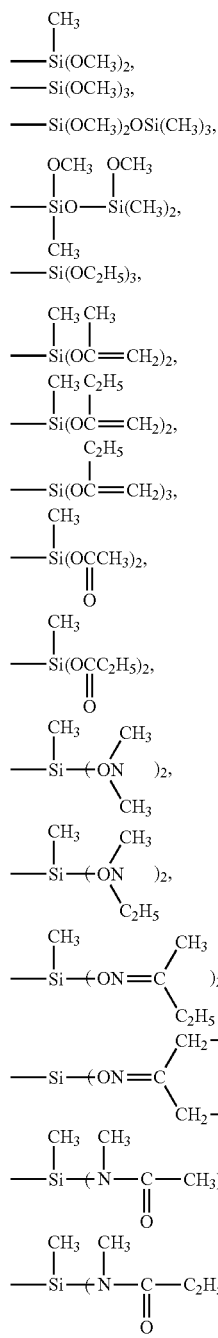

[Chemical Formula 1]

Among these, alkoxysilyl groups are preferred from the standpoint of ease of handleability.

The alkoxy group bonded to the silicon atom on the alkoxysilyl group is not particularly limited, but the alkoxy group is preferably a methoxy group, an ethoxy group, or a propoxy group because raw materials for such are readily available.

Groups other than the alkoxy group bonded to the silicon atom on the alkoxysilyl group are not subjected to any particular limitation, although preferred examples include hydrogen atoms, and alkyl groups, alkenyl groups, and arylalkyl groups that have 20 carbon atoms or less, such as methyl groups, ethyl groups, propyl groups, and isopropyl groups.

Preferred Embodiment

The compound (A) is preferably a compound obtained by reacting an epoxy compound (e) with a compound (f) having a reactive group that reacts with the epoxy group contained in the epoxy compound (e).

The epoxy compound (e) is not particularly limited as long as the epoxy compound (e) is a compound having at least one epoxy group.

Specific examples of the epoxy compound (e) include glycidyl ether type obtained by reacting epichlorohydrin with a polyhydric phenol, such as bisphenol A, bisphenol F, bisphenol S, hexahydrobisphenol A, tetramethylbisphenol A, pyrocatechol, resorcinol, cresol novolac, tetrabromobisphenol A, trihydroxybiphenyl, bisresorcinol, bisphenol hexafluoroacetone, tetramethylbisphenol F, bixylenol, and dihydroxynaphthalene; polyglycidyl ether type obtained by reacting epichlorohydrin with an aliphatic polyhydric alcohol, such as glycerin, neopentyl glycol, ethylene glycol, propylene glycol, butylene glycol, hexylene glycol, polyethylene glycol, and polypropylene glycol; glycidyl ether ester type obtained by reacting epichlorohydrin with a hydroxycarboxylic acid, such as p-oxybenzoic acid and β-oxynaphthoic acid; polyglycidyl ester type derived from polycarboxylic acids, such as phthalic acid, methylphthalic acid, isophthalic acid, terephthalic acid, tetrahydrophthalic acid, hexahydrophthalic acid, endomethylene tetrahydrophthalic acid, endomethylene hexahydrophthalic acid, trimellitic acid, and polymerized fatty acids; glycidylaminoglycidyl ether type derived from aminophenols and aminoalkylphenols; glycidylaminoglycidyl ester type derived from aminobenzoic acids; glycidylamine type derived from aniline, toluidine, tribromoaniline, xylylenediamine, diamino cyclohexane, bisaminomethylcyclohexane, 4,4'-diaminodiphenyl methane, and 4,4'-diaminodiphenyl sulfone; epoxidized polyolefin, glycidylhydantoin, glycidylalkylhydantoin, triglycidyl cyanurate, and the like; monoepoxy compounds, such as butyl glycidyl ether, phenyl glycidyl ether, alkyl phenyl glycidyl ether, glycidyl benzoate, and styrene oxide; and the like. One type or a mixture of two or more types of these can be used.

The epoxy compound (e) is preferably an aromatic epoxy compound or an epoxy silane compound, and is more preferably an aromatic epoxy compound.

The aromatic epoxy compound is not particularly limited as long as the aromatic epoxy compound is an epoxy compound having at least one aromatic ring. Specific examples and preferred form of the aromatic ring are the same as those of the aromatic ring contained in the compound (A) described above.

The compound (f) is not particularly limited as long as the compound (f) is a compound having at least one reactive group that reacts with the epoxy group contained in the epoxy compound (e).

Specific examples of the reactive group that reacts with the epoxy group contained in the epoxy compound (e) include amino groups, imino groups, ureide groups, mercapto groups, and acid anhydride groups.

Specific examples of the compound (f) include aminosilane compounds, such as γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β(aminoethyl)γ-aminopropyltrimethoxysilane, N-β(aminoethyl)γ-aminopropylmethyldimethoxysilane, N-β(aminoethyl)γ-aminopropyltriethoxysilane, N-β(aminoethyl)γ-aminopropylethyldiethoxysilane, 3,3-dimethyl-4-aminobutyltrimethoxysilane, 3,3-dimethyl-4-aminobutylmethyldimethoxysilane; iminosilane compounds, such as (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethyloxysilane, compounds represented by Formula (1) below and N-phenyl-3-aminopropyltrimethoxysilane represented by Formula (2) below:

[Chemical Formula 2]

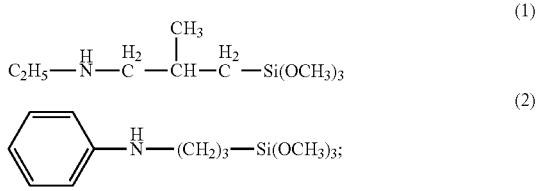

ureide silane compounds, such as γ-ureidepropyltrimethoxysilane; mercapto silane compounds, such as γ-mercaptopropyltrimethoxysilane, γ-mercaptopropyltriethoxysilane, γ-mercaptopropylmethyldimethoxysilane, and γ-mercaptopropylmethyldiethoxysilane.

These may be used alone, or two or more types may be used in combination.

The compound (f) described above is preferably a compound having an amino group (—NH$_2$) or an imino group (=NH, —NH—). Among these, the compound (f) is preferably an iminosilane compound or an aromatic amine compound, and is more preferably an iminosilane compound.

The iminosilane compound is not particularly limited as long as the iminosilane compound is a silane compound having an imino group. Specific examples of the iminosilane compound are as described above.

When the compound (f) has an amino group or an imino group, the number of equivalent of active hydrogen in the amino group or the imino group contained in the compound (f) (when the compound (f) has both an amino group and an imino group, the total number of equivalent of the amino group and the imino group) is preferably from 0.1 to 1.0 equivalent relative to the amount of epoxy group contained in the epoxy compound (e), and more preferably 0.6 equivalent or greater since the pull-in amount will be low.

Glycidyl Compound (B)

The glycidyl compound (B) contained in the composition of the present invention is not particularly limited as long as the glycidyl compound (B) is a compound having at least one glycidyl group.

Specific examples of the glycidyl compound (B) include compounds having at least one glycidyl group described as the specific examples of the epoxy compound (e) described above. Among these, a glycidylaminoglycidyl ether type is preferable.

The glycidyl compound (B) preferably has no reactive silicon-containing group.

Compound (C) Having Silsesquioxane Cage Structure

The compound (C) contained in the composition of the present invention is not particularly limited as long as at least a part of the compound has a silsesquioxane cage structure. Note that "silsesquioxane cage structure" is a silsesquioxane structure having a cage-like skeleton. Furthermore, "silsesquioxane structure" is a structure formed from repeating units: $RSiO_{1.5}$ (R: hydrogen atom or substituent).

The silsesquioxane cage structure may be a complete silsesquioxane cage structure or an incomplete silsesquioxane cage structure; however, the silsesquioxane cage structure is preferably a complete silsesquioxane cage structure.

A part of the compound (C) may have a random or ladder type silsesquioxane structure.

The compound (C) is preferably cage-type silsesquioxane, and especially, the compound (C) is preferably a compound represented by any one of Formulas (B-1) to (B-3) below.

[Chemical Formula 3]

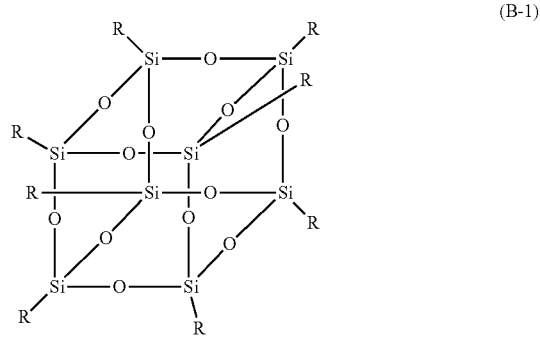

[Chemical Formula 4]

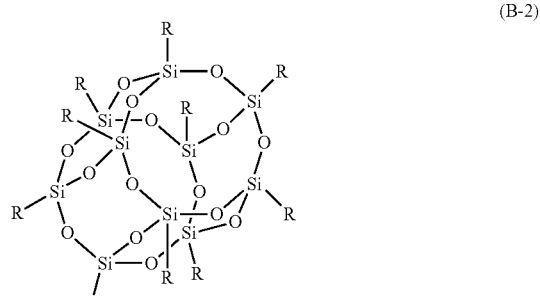

[Chemical Formula 5]

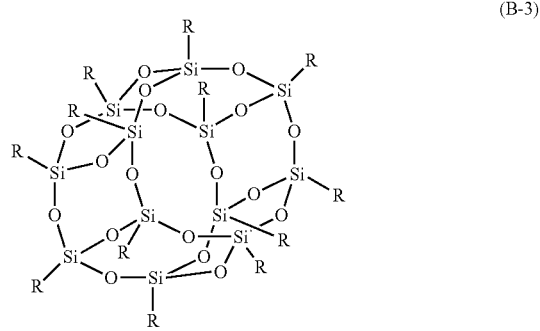

In the Formulas (B-1) to (B-3), R represents a hydrogen atom or a substituent. Note that the plurality of R moieties may be the same or different.

The substituent is not particularly limited as long as the substituent is a monovalent substituent. Specific examples thereof include hydrocarbon groups that may have a halogen atom, hydroxy group, nitro group, carboxy group, alkoxy group, amino group, mercapto group, acyl group, imide group, phosphino group, phosphinyl group, silyl group, or hetero atom, (meth)acryl group-containing groups, and epoxy group-containing groups. Among these, an epoxy group-containing group (preferably a glycidyl group- (—$CH_2$-A, A: epoxy group) containing group, and more preferably a glycidoxy group- (—O—B, B: glycidyl group) containing group) is preferable.

Examples of the halogen atom include a fluorine atom, chlorine atom, bromine atom, and iodine atom.

Examples of the hetero atom of the hydrocarbon group that may have a hetero atom include an oxygen atom, nitrogen atom, sulfur atom, and phosphorous atom.

Examples of the hydrocarbon group that may have a hetero atom include aliphatic hydrocarbon groups, aromatic hydrocarbon groups, and groups that have a combination of these.

The aliphatic hydrocarbon group may be in a form of straight-chain, branched-chain, or ring. Specific examples of the aliphatic hydrocarbon group include straight-chain or branched alkyl groups (especially, those having from 1 to 30 carbon atoms), straight-chain or branched alkenyl groups (especially, those having from 2 to 30 carbon atoms), and straight-chain or branched alkynyl groups (especially, those having from 2 to 30 carbon atoms).

Examples of the aromatic hydrocarbon group include aryl groups, and naphthyl groups. Examples of the aryl group include aryl groups having form 6 to 18 carbon atoms, such as a phenyl group, tolyl group, and xylyl group.

R in the Formulas (B-1) to (B-3) is preferably a group represented by Formula (X) below.

[Chemical Formula 6]

　　　　　　　　　　　　　　Formula (X)

$R_x$-$L_1$-*

In Formula (X) above, $R_x$ represents an epoxy group, glycidyl group, amino group, vinyl group, (meth)acryl group, or mercapto group.

In Formula (X) above, $L_1$ represents a single bond or a divalent organic group.

Examples of the divalent organic group include divalent aliphatic hydrocarbon groups (e.g. alkylene group, preferably having from 1 to 8 carbon atoms), divalent aromatic hydrocarbon groups (e.g. arylene group, preferably having from 6 to 12 carbon atoms), —O—, —S—, —$SO_2$—, —NR— (R: hydrocarbon group), —$SiR_1R_2$— ($R_1$ and $R_2$: hydrocarbon group), —CO—, —NH—, —COO—, —CONH—, and groups that have a combination of these (e.g. alkyleneoxy groups, alkyleneoxycarbonyl groups, and alkylenecarbonyloxy groups). Among these, alkylene groups, —O—, —S—, —NR—, or groups that have a combination of these are preferable.

In Formula (X) above, * indicates a bonding position.

The proportion of the compound that is represented by any one of Formulas (B-1) to (B-3) above is preferably 50 mass % or greater, and more preferably 70 mass % or greater, in the compound (C).

The compound (C) is preferably a compound obtained by subjecting at least one type of silane selected from the group consisting of epoxysilane, aminosilane, vinylsilane, methacrylsilane, acrylsilane, and mercaptosilane to condensation.

Among these, the compound (C) is more preferably a compound obtained by subjecting silane represented by Formula (3) below to condensation.

[Chemical Formula 7]

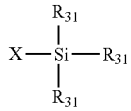　　　　　　　　　　　　　　Formula (3)

The definition, specific examples, and preferred forms of X in Formula (3) above are the same as those of the group represented by Formula (X) above.

In Formula (3) above, $R_{31}$ represents a hydrolyzable group.

The hydrolyzable group is not particularly limited; however, examples thereof include alkoxy groups, phenoxy groups, carboxyl groups, and alkenyloxy groups. Among these, alkoxy groups are preferable. When the hydrolyzable group is an alkoxy group, the number of carbon atoms of the alkoxy group is preferably from 1 to 16, and more preferably from 1 to 4. Examples of the alkoxy group having from 1 to 4 carbon atoms include a methoxy group, ethoxy group, and propoxy group.

The proportion (A/(A+B+C)) of the content of the compound (A) in a total content (A+B+C) of the content of the compound (A), the content of the glycidyl compound (B), and the content of the compound (C) is preferably from 20 to 70 mass %, and more preferably from 30 to 50 mass %.

The proportion (B/(A+B+C)) of the content of the glycidyl compound (B) in the total content (A+B+C) is preferably from 20 to 70 mass %, and more preferably from 40 to 60 mass %.

The proportion (C/(A+B+C)) of the content of the compound (C) in the total content (A+B+C) is preferably from 5 to 40 mass %, more preferably from 5 to 25 mass %, even more preferably 7 mass % or greater, and particularly preferably 10 mass % or greater.

The proportion (A/(A+B+C)) of the content of the compound (A) in the total content (A+B+C) of 20 to 70 mass %, the proportion (B/(A+B+C)) of the content of the glycidyl compound (B) in the total content (A+B+C) of 20 to 70 mass %, and the proportion (C/(A+B+C)) of the content of the compound (C) in the total content (A+B+C) of 5 to 40 mass % are preferable. In particular, the proportion (A/(A+B+C)) of the content of the compound (A) in the total content (A+B+C) of 30 to 50 mass %, the proportion (B/(A+B+C)) of the content of the glycidyl compound (B) in the total content (A+B+C) of 40 to 60 mass %, and the proportion (C/(A+B+C)) of the content of the compound (C) in the total content (A+B+C) of 5 to 25 mass % are more preferable.

Optional Component

The composition of the present invention may further contain additives within a scope that does not inhibit the effect or purpose thereof.

Examples of the additive include curing agents, fillers, reaction retarders, antiaging agents, antioxidants, pigments (dyes), plasticizers, thixotropic agents, UV absorbents, flame retardants, solvents, surfactants (including leveling agents), dispersants, dehydrating agents, adhesion imparting agents, antistatic agents, and silane coupling agents excluding (A) to (C) described above.

Imidazole Compound (D)

The composition of the present invention preferably contains an imidazole compound (D). The imidazole compound (D) functions mainly as a curing agent.

The imidazole compound (D) is not particularly limited as long as the imidazole compound (D) is imidazole or an imidazole compound (e.g. imidazole derivative).

The imidazole compound (D) is preferably a compound represented by Formula (4) below.

[Chemical Formula 8]

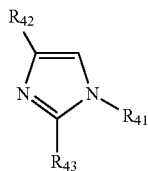

Formula (4)

In Formula (4) above, $R_{41}$ to $R_{43}$ each independently represent a hydrogen atom or a substituent. The definition, specific examples, and preferred forms of the substituent are the same as those of R in Formulas (B-1) to (B-3) described above. $R_{43}$ is preferably an alkyl group (preferably having from 1 to 30 carbon atoms).

The content of the imidazole compound (D) is not particularly limited; however, the proportion of the content of the imidazole compound (D) in the total content (A+B+C) is preferably from 1 to 20 mass %, and more preferably from 5 to 15 mass %.

Method of Producing Composition of Present Invention

The method of producing the composition of the present invention is not particularly limited, and an example thereof is a method that uniformly mixes each of the components described above using conventionally known devices. Note that, when the composition of the present invention contains a curing agent such as an imidazole compound, it is preferable to mix the components other than the curing agent and then mix the curing agent.

Method of Curing Composition of Present Invention

The method of curing the composition of the present invention is not particularly limited, and examples thereof include a method of heating the composition at 100 to 200° C. for 10 minutes to 5 hours, and the like.

Use

Since the composition of the present invention has a low pull-in amount, the composition is useful as an adhesive composition for an optical fiber. Furthermore, as described above, since the composition of the present invention has a low pull-in amount even when used for high power applications (100 mW or greater, preferably 1 W or greater), the composition is particularly useful as an adhesive composition for a high-power optical fiber. For example, the composition of the present invention is useful as an adhesive composition for an optical fiber that is required for high power transmission, such as ultralong distance transmission or wavelength multiplex transmission.

Connector

An embodiment of a connector produced by using the composition of the present invention will be described below with reference to the drawing.

FIG. 1 is a cross-sectional view of an embodiment of a connector produced using the adhesive composition of the present invention.

The connector 10 is a connector formed by removing a polymer coating layer of an edge portion of an optical fiber 1 having a core part 2, a cladding part 3, and a polymer coating layer 4; coating the composition of the present invention described above on the part where the polymer coating layer has been removed; inserting it to a cavity portion of a ferrule 7 that is fixed on a flange 8; and heating the assembly to adhere the optical fiber 1 and the ferrule 7 by sandwiching an adhesive layer 6 (cured product of the composition of the present invention) therebetween.

EXAMPLES

Hereinafter, the present invention will be further described in detail with reference to examples; however, the present invention is not limited thereto.

Synthesis of Compound (A)

Components shown in Table 1 below were mixed at compositions (part by mass) shown in the same table and stirred in an inert gas atmosphere at 120° C. for 8 hours to obtain compounds A1, A2, A3, A4, A5, and A6, which were the compound (A) having an aromatic ring and a reactive silicon-containing group.

TABLE 1

|  | Compound A1 | Compound A2 | Compound A3 | Compound A4 | Compound A5 | Compound A6 |
|---|---|---|---|---|---|---|
| Epoxy compound e1 | 100 |  |  | 100 |  |  |
| Epoxy compound e2 |  | 100 |  |  | 100 |  |
| Epoxy compound e3 |  |  | 238 |  |  | 358 |
| Iminosilane compound f1 | 64 | 70 |  | 96 | 105 |  |
| Amine compound f2 |  |  | 100 |  |  | 100 |
| Number of equivalent (equivalent) | 0.5 | 0.5 | 0.5 | 0.75 | 0.75 | 0.75 |

The components listed in Table 1 are described below.

Epoxy compound e1: Epotohto YDF-128 (bisphenol A diglycidyl ether, manufactured by Tohto Kasei Co., Ltd.) (The structure is illustrated below)

[Chemical Formula 9]

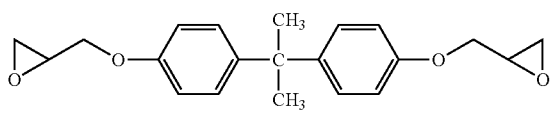

Epoxy compound e2: Epotohto YDF-170 (bisphenol F diglycidyl ether, manufactured by Tohto Kasei Co., Ltd.) (The structure is illustrated below)

[Chemical Formula 10]

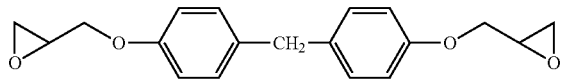

Epoxy compound e3: 3-glycidoxypropyltrimethoxysilane (A-187, manufactured by Momentive Performance Materials Inc.) (The structure is illustrated below)

[Chemical Formula 11]

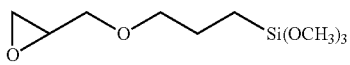

Iminosilane compound f1: Alink-15 (N-ethyl-3-aminoisobutyltrimethoxysilane, manufactured by Dow Corning Toray Co., Ltd.) (The structure is illustrated below)

[Chemical Formula 12]

Amine compound f2: methylenedianiline (MDA, manufactured by Kanto Chemical Co., Ltd.) (The structure is illustrated below)

[Chemical Formula 13]

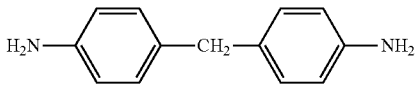

In Table 1, the number of equivalent indicates the number of equivalent (equivalent) of active hydrogen in the amino group or the imino group contained in the iminosilane compound f1 or the amine compound f2 relative to the amount of the epoxy group contained in the epoxy compounds e1 to e3.

Note that, when one molecule of the epoxy compound e1 and one molecule of the iminosilane compound f1 are reacted, the following compound can be obtained.

[Chemical Formula 14]

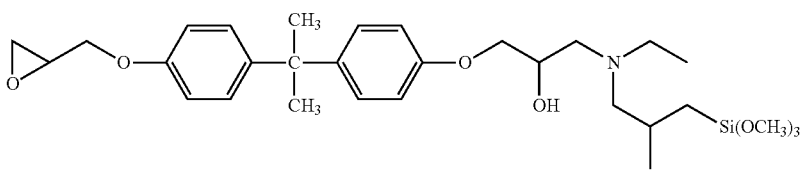

Furthermore, when one molecule of the epoxy compound e2 and one molecule of the iminosilane compound f1 are reacted, the following compound can be obtained.

[Chemical Formula 15]

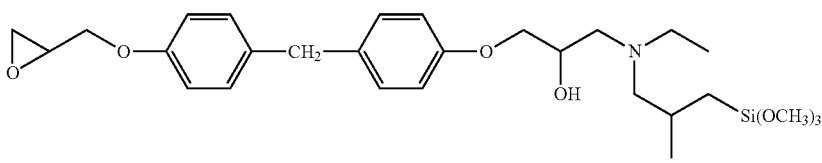

Furthermore, when one molecule of the epoxy compound e3 and one molecule of the amine compound f2 are reacted, the following compound can be obtained.

[Chemical Formula 16]

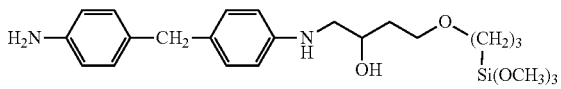

Synthesis of Compound C1

In a reaction vessel equipped with a stirrer, a dropping funnel, and a thermometer, 50 mL of isopropanol (IPA) as a solvent and 4.0 g of 5% tetramethylammonium hydroxide (TMAH) aqueous solution as a basic catalyst were loaded. In a dropping funnel, 15 mL of IPA and 23.36 g of 3-glycidoxypropyltrimethoxysilane were charged, and while the content of the reaction vessel was being stirred, the IPA solution of 3-glycidoxypropyltrimethoxysilane was added dropwise at room temperature over 30 minutes. After the completion of the dropwise addition, the mixture was stirred for 6 hours without being heated. After the 6 hours of stirring, the IPA (solvent) was removed under reduced pressure, and the obtained substance was dissolved in toluene. After this solution was washed with saturated saline until the solution became neutral, the solution was dehydrated with anhydrous magnesium sulfate. The anhydrous magnesium sulfate was then filtered out, and the obtained substance was condensed to obtain a hydrolysis product (silsesquioxane).

Thereafter, in a reaction vessel equipped with a stirrer, a Dean-Stark apparatus, and a condenser tube, the silsesquioxane obtained as described above, 50 mL of toluene, and 2.1 g of 10% TMAH aqueous solution were loaded and gradually heated to distill off water. Furthermore, the mixture was heated to 120° C., and recondensation reaction was performed again at the reflux temperature of toluene. At this time, the temperature of the reaction solution was 108° C. After the reflux using toluene, the obtained substance was stirred for 2 hours, and then the reaction was terminated. After the reaction solution was washed with saturated saline until the reaction solution became neutral, the reaction solution was dehydrated with anhydrous magnesium sulfate. The anhydrous magnesium sulfate was then filtered out, and the obtained substance was condensed to obtain 15.65 g of cage-type silsesquioxane (mixture), which was the target product. The obtained cage-type silsesquioxane (mixture)

was a colorless viscous liquid that was soluble in various organic solvents. The obtained cage-type silsesquioxane (mixture) was used as the compound C1.

For the compound C1, the content of the cage-type silsesquioxane was determined by GPC analysis and NMR analysis, and the content was 71 mass %. Specifically, the content was determined as described below.

Figure 2:
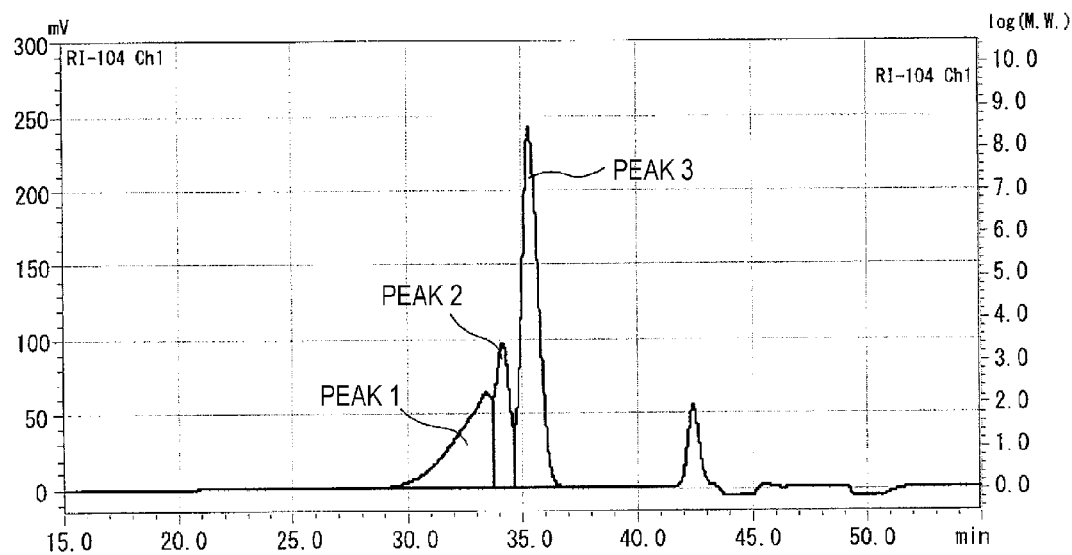
FIG. 2 is a GPC chromatogram of the compound C1 (silsesquioxane cage (mixture)).

First, GPC analysis was conducted for the compound C1 in the following conditions. FIG. 2 shows a GPC chromatogram. Furthermore, the molecular weight of each peak (based on polypropylene glycol (PPG)), distribution, and area of the GPC are shown below. Each peak (peaks 1 to 3) of the GPC was isolated and identified by NMR. The peaks 2 and 3 were peaks originated from cage-type silsesquioxane. The content (mass %) of the cage-type silsesquioxane in the compound C1 was determined from the proportion of the total area (71) of the peaks 2 and 3 relative to the total area (100) of the peaks 1 to 3.

Conditions of GPC Analysis
  Instrument: GPC system, manufactured by Shimadzu Corporation
  System controller: CBM-20A
  Column oven: CTO-20A
  Online degassing unit: DGU-20A3
  Liquid delivery pump: LC-20AD
  Autosampler: SIL-20AHT
  Eluent: THF
  Detector: RI detector

TABLE 2

|        | Mn   | Mw   | Mz   | Mw/Mn   | Mz/Mw   | %       |
|--------|------|------|------|---------|---------|---------|
| Total  | 1601 | 2368 | 4116 | 1.47864 | 1.73825 | 100     |
| Peak 1 | 3995 | 4740 | 5968 | 1.18664 | 1.25906 | 29.1408 |
| Peak 2 | 2022 | 2047 | 2073 | 1.01248 | 1.01234 | 17.8696 |
| Peak 3 | 1144 | 1171 | 1198 | 1.02374 | 1.02277 | 52.9896 |

Preparation of Adhesive Composition

Components of liquid A shown in Table 2 below were mixed at compositions (part by mass) shown in the same table and stirred with a stirrer. Thereafter, components of liquid B shown in the same table were added and stirred with a stirrer to prepare an adhesive composition of each of working examples and comparative examples.

Note that, for the compound C1, the values written on the upper row are the amounts (part by mass) of cage-type silsesquioxane (mixture), and the values written on the lower row (values written in parentheses) are the net amounts (part by mass) of the cage-type silsesquioxane contained in the cage-type silsesquioxane (mixture).

Evaluation of Pull-in Amount

An SC connector having a form illustrated in FIG. 1 (using a fixed attenuator (5 to 20 dB) that is not illustrated) was produced using the prepared adhesive composition. An adhesive layer was formed as described below. For a single-mode optical fiber having a core part, a cladding part, and a polymer coating layer, a length of 2 cm of the polymer coating layer located at the edge portion of the single-mode optical fiber was removed. The prepared adhesive composition was coated on the portion where the polymer coating layer was removed. The optical fiber coated with the adhesive composition was then inserted to a cavity portion of a zirconia ferrule through the edge of a plug, and heated at 130° C. for 3 hours to cure, thereby forming an adhesive layer.

The pull-in amount of the optical fiber when continuous wave operation was performed at 1 W for 40 minutes using an LD light (wavelength: 1.55 μm) was measured with the obtained SC connector. The results are shown in Table 2. Practically, the pull-in amount is preferably 50 nm or lower.

TABLE 3

|   |   | Table 2-1 | Working Example 1 | Working Example 2 | Working Example 3 | Working Example 4 | Working Example 5 | Working Example 6 | Working Example 7 |
|---|---|---|---|---|---|---|---|---|---|
| Liquid A | Compound A1 |   | 40 |   |   |   |   |   | 40 |
|   | Compound A2 |   |   | 40 |   |   |   |   |   |
|   | Compound A3 |   |   |   | 40 |   |   |   |   |
|   | Compound A4 |   |   |   |   | 40 |   |   |   |
|   | Compound A5 |   |   |   |   |   | 40 |   |   |
|   | Compound A6 |   |   |   |   |   |   | 40 |   |
|   | Glycidyl compound B1 |   | 50 | 50 | 50 | 50 | 50 | 50 | 50 |
|   | Silane coupling agent |   |   |   |   |   |   |   |   |
|   | Compound C1 |   | 10 (7) | 10 (7) | 10 (7) | 10 (7) | 10 (7) | 10 (7) | 10 (7) |
|   | Imidazolesilane |   | 7 | 7 | 7 | 7 | 7 | 7 | 7 |
|   | Catalyst |   | 5 | 5 | 5 | 5 | 5 | 5 | 5 |
| Liquid B | Water |   | 5 | 5 | 5 | 5 | 5 | 5 |   |
|   | Imidazole compound D1 |   |   |   |   |   |   |   | 10 |
|   | Pull-in amount [nm] |   | 30.4 | 42.5 | 48.3 | 27.1 | 32.5 | 40.3 | 18.1 |

|   |   | Table 2-1 | Working Example 8 | Working Example 9 | Working Example 10 | Working Example 11 | Working Example 12 | Comparative Example 1 | Comparative Example 2 |
|---|---|---|---|---|---|---|---|---|---|
| Liquid A | Compound A1 |   |   |   |   |   |   |   |   |
|   | Compound A2 |   | 40 |   |   |   |   |   |   |
|   | Compound A3 |   |   | 40 |   |   |   |   |   |
|   | Compound A4 |   |   |   | 40 |   |   | 40 |   |
|   | Compound A5 |   |   |   |   | 40 |   |   | 40 |
|   | Compound A6 |   |   |   |   |   | 40 |   |   |

TABLE 3-continued

|  |  | | | | | | | |
|---|---|---|---|---|---|---|---|---|
| | Glycidyl compound B1 | 50 | 50 | 50 | 50 | 50 | 50 | 50 |
| | Silane coupling agent | | | | | | | 10 |
| | Compound C1 | 10 (7) | 10 (7) | 10 (7) | 10 (7) | 10 (7) | | |
| | Imidazolesilane | | | | | | 7 | |
| | Catalyst | | | | | | 5 | |
| Liquid | Water | | | | | | 5 | |
| B | Imidazole compound D1 | 10 | 10 | 10 | 10 | 10 | | 10 |
| Pull-in amount [nm] | | 21.8 | 35.3 | 16.3 | 20.3 | 32.5 | 82.3 | 70.4 |

TABLE 4

| | Table 2-2 | Working Example 8 | Working Example 9 | Working Example 10 | Working Example 11 | Working Example 12 | Comparative Example 1 | Comparative Example 2 |
|---|---|---|---|---|---|---|---|---|
| Liquid A | Compound A1 | | | | | | | |
| | Compound A2 | 40 | | | | | | |
| | Compound A3 | | 40 | | | | | |
| | Compound A4 | | | 40 | | | | 40 |
| | Compound A5 | | | | 40 | | | 40 |
| | Compound A6 | | | | | 40 | | |
| | Glycidyl compound B1 | 50 | 50 | 50 | 50 | 50 | 50 | 50 |
| | Silane coupling agent | | | | | | | 10 |
| | Compound C1 | 10 (7) | 10 (7) | 10 (7) | 10 (7) | 10 (7) | | |
| | Imidazolesilane | | | | | | 7 | |
| | Catalyst | | | | | | 5 | |
| Liquid B | Water | | | | | | 5 | |
| | Imidazole compound D1 | 10 | 10 | 10 | 10 | 10 | | 10 |
| Pull-in amount [nm] | | 21.8 | 35.3 | 16.3 | 20.3 | 32.5 | 82.3 | 70.4 |

The components listed in Table 2 are described below.

Compound A1: Compound A1 synthesized as described above

Compound A2: Compound A2 synthesized as described above

Compound A3: Compound A3 synthesized as described above

Compound A4: Compound A4 synthesized as described above

Compound A5: Compound A5 synthesized as described above

Compound A6: Compound A6 synthesized as described above

Glycidyl compound B1: MY-0510 (triglycidyl-p-aminophenol, manufactured by Huntsman Advanced Materials) (The structure is illustrated below)

[Chemical Formula 17]

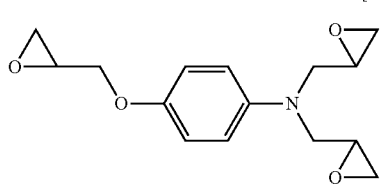

Silane coupling agent: A187 (3-glycidoxypropyltrimethoxysilane, manufactured by Momentive Performance Materials Inc.) (The structure is illustrated below)

[Chemical Formula 18]

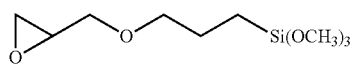

Compound C1: Compound C1 synthesized as described above

Imidazolesilane: IM-1000 (manufactured by JX Nippon Mining & Metals Corp.)

[Chemical Formula 19]

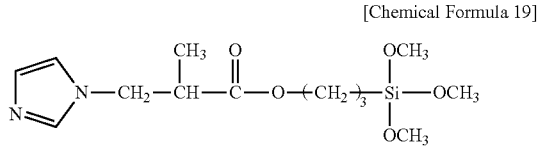 [SMILES: CO[Si](COC(=O)C(C)Cn1ccnc1)(OC)OC]

Catalyst: TPT-100 (tetrapropoxytitanium, manufactured by Nippon Soda Co., Ltd.)

Water

Imidazole compound D1: 1B2MZ (1-benzyl-2-methylimidazole, manufactured by Shikoku Chemicals Corporation) (The structure is illustrated below; Me represents a methyl group and Bz represents a benzyl group)

[Chemical Formula 20]

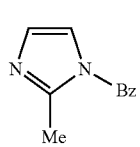

As is clear from Table 2, the adhesive compositions of Working Examples 1 to 12, which contained the compound (C) having a silsesquioxane cage structure resulted in lower pull-in amount compared to the adhesive compositions of Comparative Examples 1 and 2, which contained no compound (C) having a silsesquioxane cage structure. In particular, Working Examples 7 to 12, in which an imidazole compound (D) was further contained and the imidazole compound (D) was the compound represented by Formula (4) above and $R_{43}$ in the Formula (4) was an alkyl group, tended to have even lower pull-in amount.

From the comparison of Working Examples 1 and 4, Working Example 4, in which the number of equivalent of active hydrogen in the amino group or the imino group was 0.6 equivalent or greater relative to the amount of epoxy group contained in the epoxy compound (e), resulted in even lower pull-in amount. Similarly, from the comparison of Working Examples 2 and 5, comparison of Working Examples 3 and 6, comparison of Working Examples 7 and 10, comparison of Working Examples 8 and 11, and comparison of Working Examples 9 and 12, Working Examples 5, 6, 10, 11, and 12, in which the number of equivalent of active hydrogen in the amino group or the imino group was 0.6 equivalent or greater relative to the amount of epoxy group contained in the epoxy compound (e), resulted in even lower pull-in amounts.

REFERENCE SIGNS LIST

1 Optical fiber
2 Core part
3 Cladding part
4 Polymer coating layer
6 Adhesive layer
7 Ferrule
8 Flange
10 Connector

The invention claimed is:

1. An adhesive composition for a high-power optical fiber comprising: a compound (A) having an aromatic ring and a reactive silicon-containing group; a glycidyl compound (B); and a compound (C) having a silsesquioxane cage structure, wherein
a proportion (A/(A+B+C)) of a content of the compound (A) in a total content (A+B+C) of the content of the compound (A), a content of the glycidyl compound (B), and a content of the compound (C) is from 20 to 70 mass %;
a proportion (B/(A+B+C)) of the content of the glycidyl compound (B) in the total content (A+B+C) is from 20 to 70 mass %; and
a proportion (C/(A+B+C)) of the content of the compound (C) in the total content (A+B+C) is from 5 to 40 mass %.

2. The adhesive composition for a high-power optical fiber according to claim 1, further comprising an imidazole compound (D).

3. The adhesive composition for a high-power optical fiber according to claim 1, wherein the reactive silicon-containing group is a hydrolyzable silicon-containing group.

4. The adhesive composition for a high-power optical fiber according to claim 1, wherein the compound (A) is obtained by reacting an epoxy compound (e) with a compound (f) having a reactive group that reacts with the epoxy group contained in the epoxy compound (e).

5. The adhesive composition for a high-power optical fiber according to claim 4, wherein the epoxy compound (e) is an aromatic epoxy compound, and the compound (f) is an iminosilane compound.

6. The adhesive composition for a high-power optical fiber according to claim 4, wherein the epoxy compound (e) is an epoxysilane compound, and the compound (f) is an aromatic amine compound.

7. The adhesive composition for a high-power optical fiber according to claim 4, wherein the compound (f) has an amino group or an imino group, and the number of equivalent of active hydrogen in the amino group or the imino group is from 0.1 to 1.0 equivalent relative to the amount of epoxy group contained in the epoxy compound (e).

8. The adhesive composition for a high-power optical fiber according to claim 1, wherein the compound (C) is obtained by subjecting at least one type of silane selected from the group consisting of epoxysilane, aminosilane, vinylsilane, methacrylsilane, acrylsilane, and mercaptosilane to condensation.

9. The adhesive composition for a high-power optical fiber according to claim 2, wherein the reactive silicon-containing group is a hydrolyzable silicon-containing group.

10. The adhesive composition for a high-power optical fiber according to claim 2, wherein the compound (A) is obtained by reacting an epoxy compound (e) with a compound (f) having a reactive group that reacts with the epoxy group contained in the epoxy compound (e).

11. The adhesive composition for a high-power optical fiber according to claim 3, wherein the compound (A) is obtained by reacting an epoxy compound (e) with a compound (f) having a reactive group that reacts with the epoxy group contained in the epoxy compound (e).

12. The adhesive composition for a high-power optical fiber according to claim 9, wherein the compound (A) is obtained by reacting an epoxy compound (e) with a compound (f) having a reactive group that reacts with the epoxy group contained in the epoxy compound (e).

13. The adhesive composition for a high-power optical fiber according to claim 5, wherein
the compound (f) has an amino group or an imino group, and
the number of equivalent of active hydrogen in the amino group or the imino group is from 0.1 to 1.0 equivalent relative to the amount of epoxy group contained in the epoxy compound (e).

14. The adhesive composition for a high-power optical fiber according to claim 6, wherein
the compound (f) has an amino group or an imino group, and
the number of equivalent of active hydrogen in the amino group or the imino group is from 0.1 to 1.0 equivalent relative to the amount of epoxy group contained in the epoxy compound (e).

15. The adhesive composition for a high-power optical fiber according to claim 2, wherein the compound (C) is obtained by subjecting at least one type of silane selected from the group consisting of epoxysilane, aminosilane, vinylsilane, methacrylsilane, acrylsilane, and mercaptosilane to condensation.

16. The adhesive composition for a high-power optical fiber according to claim 3, wherein the compound (C) is obtained by subjecting at least one type of silane selected from the group consisting of epoxysilane, aminosilane, vinylsilane, methacrylsilane, acrylsilane, and mercaptosilane to condensation.

17. The adhesive composition for a high-power optical fiber according to claim 4, wherein the compound (C) is obtained by subjecting at least one type of silane selected from the group consisting of epoxysilane, aminosilane, vinylsilane, methacrylsilane, acrylsilane, and mercaptosilane to condensation.

18. The adhesive composition for a high-power optical fiber according to claim 5, wherein the compound (C) is obtained by subjecting at least one type of silane selected from the group consisting of epoxysilane, aminosilane, vinylsilane, methacrylsilane, acrylsilane, and mercaptosilane to condensation.

19. The adhesive composition for a high-power optical fiber according to claim 6, wherein the compound (C) is obtained by subjecting at least one type of silane selected from the group consisting of epoxysilane, aminosilane, vinylsilane, methacrylsilane, acrylsilane, and mercaptosilane to condensation.

* * * * *